United States Patent [19]

Chenot

[11] 3,962,118

[45] June 8, 1976

[54] METHOD OF MAKING IMPROVED MAGNESIUM GALLATE PHOSPHORS

[75] Inventor: Charles F. Chenot, Towanda, Pa.

[73] Assignee: GTE Sylvania Incorporated, Stamford, Conn.

[22] Filed: Feb. 5, 1973

[21] Appl. No.: 329,651

[52] U.S. Cl. ............................................... 252/301.4 R
[51] Int. Cl.² ................. C09K 11/26; C09K 11/30; C09K 11/12; C09K 11/16
[58] Field of Search ............................... 252/301.4 R

[56] References Cited
UNITED STATES PATENTS

| | | |
|---|---|---|
| 2,392,814 | 1/1946 | Froelich ........................ 252/301.4 R |
| 3,407,325 | 10/1968 | Brown .......................... 252/301.4 R |
| 3,499,843 | 3/1970 | Brown et al. ................. 252/301.4 R |
| 3,502,592 | 3/1970 | Amster ......................... 252/301.4 R |
| 3,577,350 | 4/1971 | Amster ......................... 252/301.4 R |

*Primary Examiner*—Oscar R. Vertiz
*Assistant Examiner*—Gary P. Straub
*Attorney, Agent, or Firm*—Norman J. O'Malley; William H. McNeill; Donald R. Castle

[57] ABSTRACT

Increased luminescence intensity in magnesium aluminum gallate phosphors as well as magnesium gallate phosphors is achieved by utilizing a fluorine source in the raw material mix and by conducting initial processing in a humid, oxidizing atmosphere. Additionally, processing time is drastically reduced.

4 Claims, 2 Drawing Figures

METHOD OF MAKING IMPROVED MAGNESIUM GALLATE PHOSPHORS

BACKGROUND OF THE INVENTION

This invention relates to fluorescent phosphors and more particularly to magnesium aluminum-gallate phosphors activated by manganese which can be excited by ultraviolet light and still more particularly to an improved method of making improved phosphors of the above type.

Such phosphors are known to emit narrow bands of green light in a manner similar to the emission of pure magnesium gallate activated by manganese as disclosed by Brown in U.S. Pat. No. 3,407,325. When excited by 253.7 nm ultraviolet radiation these phosphors are particularly applicable to xerographic reproduction techniques.

As xerographic reproduction has improved, new demands have been placed upon the phosphor-lamp combination. These demands have required not only improvements in phosphor-lamp brightness, phosphor-lamp maintenance (stability) and phosphor-lamp temperature dependence stability, but changes as well in the actual emission peak position in the spectrum for the luminescent material itself.

It is known that aluminum substitution for gallium in the magnesium gallate type phosphors will cause such an emission shift. As a matter of fact, concerning aluminum substitution in this type of phosphor, the entire spinel crystalline in the MgO-Al$_2$O$_3$-Ga$_2$O$_3$ system has been studied and reported by Brown (Rf. *Journal Electrochem. Soc.* 114(3), 245–250 (1967). In general, aluminum substitution has been found to shift the peaks of the emission spectra of the phosphor materials activated by manganese to longer wavelengths (from about 510nm to 528nm). However, accompanying this spectral shift is a decrease in luminescence intensity (measured at total energy by integration of corrected relative spectral energy distribution curves) dropping to about 25% for a 50% aluminum substitution to virtually 0% for a 100% aluminum substitution. This significant drop in luminescence intensity with increased aluminum substitution essentially disqualified these aluminum-containing materials from commercial applications.

Concerning phosphor-lamp dependence stability, the effect of aluminum substitution for gallium in the synthesis of this type of phosphor is reported in British Pat. Nos. 1,159,324 and 1,242,983. Therein, temperature dependence stability has been shown to improve substantially for compositions defined by formulae of the type:

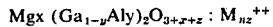

$$Mg_x (Ga_{1-y}Al y)_2 O_{3+x+z} : M_{nz}^{++}$$

wherein
$0.97 \geq x \geq 0.70$
$0.4 \geq y \geq 0.025$ and
$0.05 \geq z \geq 0.002$
and

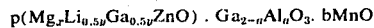

$$p(Mg_xLi_{0.5y}Ga_{0.5y}ZnO) \cdot Ga_{2-a}Al_aO_3 \cdot bMnO$$

wherein
$x+y+z = 1$
$0 \leq a \leq 1.0$
$0.002 \leq b \leq 0.06$
$0 \leq x \leq 0.96$
$0 \leq z \leq 1.00$
$0.75 \leq p \leq 1.10$
and wherein $0.05 \leq a \leq 1.0$ when $0.90 \leq z \leq 1.00$.

The resulting temperature dependence stability noted for these materials is specified particularly for high-pressure mercury vapor lamp applications where the temperature experienced by the phosphors is often in excess of 300°C. The above-cited British patents indicate a similar dramatic decrease in luminescence intensity with substitution of aluminum for gallium as originally shown by Brown; however, emphasis is placed on the fact that with superior temperature dependence stability, the aluminum substituted materials can exhibit superior luminescence intensity at higher temperatures than intensities observed for the more temperature sensitive pure magnesium gallate materials activated by manganese.

Concerning other modifications of the manganese activated magnesium gallate and aluminum-gallate phosphors, the effects on luminescence intensity and emission peak location in the spectrum for germanium and/or silicon substitution for gallium have been reported in British Pat. No. 1,248,373. In particular, luminescence intensity has been shown to be improved substantially for compositions defined by the formula:

$$xMgO \cdot (1 \leq y \leq z)Ga_2O_3 \cdot yAl_2O_3 \cdot zMO_2 : pMnO$$

wherein
$MO_2 = GeO_2$ and/or $SiO_2$
$0.70 \leq x \leq 1.05$
$0.025 \leq y \leq 0.4$
$0 \leq z \leq 0.3$
$0.001 \leq p \leq 0.05$ Spectral shifts of the emission peaks of these materials were reported in the range from about 501nm to about 514nm for the above range of compositions.

OBJECTS AND SUMMARY OF THE INVENTION

It is therefore an object of this invention to enhance phosphor of the above-described types.

It is a further object of the invention to increase the luminescence intensity of aluminum substituted magnesium gallate phosphors.

It is a still further object of this invention to enhance the method of making such phosphors.

These objects are achieved in one aspect of the invention by the provision of a method of manufacturing such phosphors which includes the steps of including in the reaction products of the raw materials a source of fluorine, thoroughly mixing these products and the source of fluorine and heat treating these raw materials in aluminum crucibles in a humidified, oxidizing atmosphere for about 2 hours at a temperature of about 1200°C–1300°C. After this initial heat treating step the material is cooled and comminuted. Thereafter, the material is reheated in silica crucibles in a reducing atmosphere for less than 40 minutes at a temperature of about 1200°C–1300°C. The material is then cooled, comminuted and sieved.

Application of this process greatly reduces preparation time as well as allowing the use of aluminum substitution for gallium with its concommitant spectral shift without adversely effecting luminescence intensity.

DESCRIPTION OF THE PREFERRED EMBODIMENTS

For a better understanding of the present invention together with other and further objects, advantages and capabilities thereof, reference is made to the following disclosure and appended claims in conjunction with the above-described drawings.

This invention relates particularly to improvements in the preparation of lamp phosphors and to the phosphors themselves and in particular to phosphor materials defined by the formula:

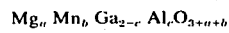

$$Mg_a Mn_b Ga_{2-c} Al_c O_{3+a+b}$$

wherein:
$0.85 \leq a+b \leq 1.05$
$0 \leq c \leq 1.2$
$0.001 \leq b \leq 0.06$

As stated above, a primary purpose of this invention is to provide a new and improved technique for preparing phosphor materials as defined by the immediately preceeding formula and wherein luminescence intensities are realized exceeding those normally observed for aluminum substituted materials. In fact, for compositions defined within the ranges set forth above, manganese-activated phosphor materials can be prepared by this new technique which exhibit substantially greater luminescence intensity when compared to the pure magnesium gallate activated by manganese.

A still further object of this invention is to provide a new technique for the preparation of the subject phosphors wherein synthesis is greatly simplified. Particular emphasis is placed on significantly shortened firing times during heat treatment procedures.

Another particular object is to provide a phosphor material wherein a broad range of emission peaks can be realized, lying in the spectral range from 503nm, for the pure magnesium gallate activated by manganese, to about 517nm, for compositions near the limit of aluminum substitution defined in the immediately preceeding formula.

Figure 1:
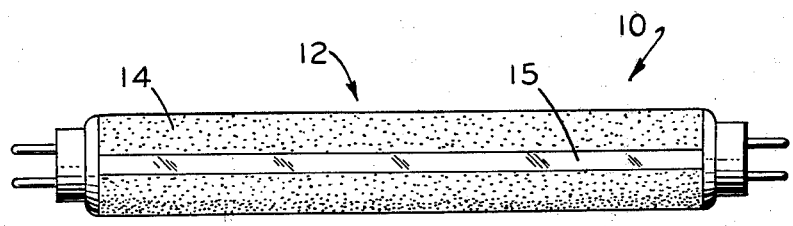
FIG. 1 is an elevational view of an aperture type fluorescent lamp which can utilize the phosphors of the invention.

Referring now to the drawings with greater particularity, there is shown in FIG. 1 a lamp 10 which comprises a sealed, hollow glass tube 12 containing a filling of 85% argon and 15% helium or other suitable gas. On the interior surface of the glass tube 12 there is disposed a coating of phosphor 14, such as the phosphors of the present invention. The phosphor extends around about 315° of the circumference of the tube, the remainder 15 being free of phosphor to allow light to emerge therethrough.

At each end of tube 12 there is an electrode comprising an oxide coated tungsten coil, two auxiliary anodes and associated lead-in wires, not shown herein but detailed in U.S. Pat. No. 2,761,566. The phosphor can be applied in a known manner.

Luminescent gallate materials as previously known have been synthesized by cumbersome procedures involving either extensive heat treatments, e.g., at temperatures greater than or equal to 1200°C for periods of 6–8 hours, or multiple heat treatments, e.g., at temperatures greater than or equal to 1200°C and as high as 1400°C for several repeated periods of 2 or more hours per period (accompanied by intermediate comminution and sieving). Such procedures are found necessary to react the raw materials used in gallate phosphor syntheses. Such materials, as finely divided powders, include the highly refractory (and slow to react) $\beta$-$Ga_2O_3$, MgO or basic $MgCO_3$ (hydromagnisite), $\alpha$-$Al_2O_3$ (or its slightly more reactive precursor $Al(OH)_3$) and some manganese compound, e.g., $MnCO_3$.

To obviate the disadvantages of the prior art, an improved method of synthesis is disclosed which utilizes the use of fluorides and an accompanying hydrolysis mechanism. This procedure requires at least partial and as much as total substitution of $MgF_2$ for the MgO (or basic $MgCO_3$) used in the prefired raw material blend. In subsequent heat treatments at temperatures greater than or equal to 1150°C the raw materials are fired in a humidified, oxidizing atmosphere such as air passed through a sparging unit containing slightly warm water.

Figure 2:
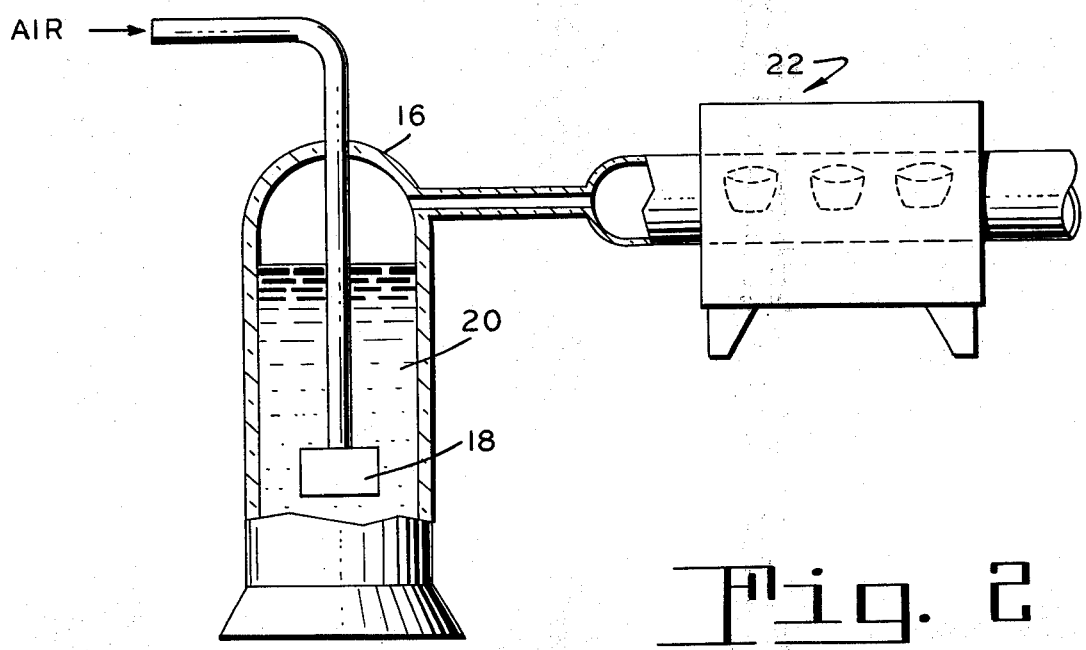
FIG. 2 is a diagrammatic representation of a gas train and furnace arrangement used in the synthesis of these phosphors.

Such a heat treatment system is shown in FIG. 2 wherein air is fed into a sparging unit 16 which contains a fritted gas dispenser 18 and warm water 20. The humidified, oxidizing atmosphere generated thereby is fed to furnace 22. The normally sluggish hydrolysis of $MgF_2$ is enhanced through catalytic action of the finely divided $\beta$-$Ga_2O_3$ and $\alpha$-$Al_2O_3$ during the heat treatment in controlled atmosphere furnace 22.

The overall result is a rapid formation of the desired spinel phase after total consumption of the fluorine through the hydrolysis mechanism according to the reaction:

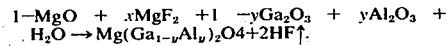

$$1-MgO + xMgF_2 + 1 - yGa_2O_3 + yAl_2O_3 + H_2O \rightarrow Mg(Ga_{1-y}Al_y)_2O_4 + 2HF\uparrow$$

Following comminution of the first-step fired material, final heat treatment under 0.25–5% $H_2$ in $N_2$ atmospheres at temperatures greater than or equal to 1150°C have been found to require no longer than ½ to ¾ of an hour of firing time, depending on sample size. In many cases, second step heat treatments carried on for longer than ¾ hour were found to be deleterious to the phosphors. These findings regarding the second step heat treatment are very much in accord with second step heat treatment procedures taught by Brown in U.S. Pat. No. 3,407,325.

The following examples are illustrative of procedures for preparing phosphors according to this invention and are not meant to be limiting.

EXAMPLE 1

An intimate blend of the following materials is prepared by ball milling:

| | | | |
|---|---|---|---|
| MgO | 0.427 mol (rel.) | 3.442 grams/0.2 mol | |
| $MgF_2$ | 0.500 " | 6.231 | " |
| $\beta$-$Ga_2O_3$ | 1.000 " | 37.488 | " |
| $MnCO_3$ | 0.033 " | 0.808 | " |

The blended materials are heat treated for about 2 hours in humid air as described above. The heat treatment is performed in alumina crucibles at temperatures around 1200°C–1300°C. Following this first step heat treatment the cooled material is subjected to comminution and a second step heat treatment. This heat treatment is performed in silica crucibles at temperatures around 1200°C–1300°C for no longer than 40 minutes, preferably about 30 minutes, in a mildly reducing atmosphere consisting of 0.25–1.00% (by volume) $H_2$ in 99.75 to 99.00% (by volume) $N_2$, preferably 0.50% $H_2$ in 99.50% $N_2$. Following this second step heat treatment, the cooled material is subjected to very mild comminution and nylon-screen sieving. The resulting phosphor is a finely divided powder exhibiting an emission peak at about 507nm and a one-half peak height band width of 32.5nm.

EXAMPLE 2

An intimate blend is prepared as in Example 1:

| | | | | |
|---|---|---|---|---|
| MgO | 0.427 | mol (rel.) | 3.442 | grams/0.2 mol |
| $MgF_2$ | 0.500 | '' | 6.231 | '' |
| $\beta$-$Ga_2O_3$ | 0.750 | '' | 28.116 | '' |
| $Al(OH)_3$ | 0.500 | '' | 7.970 | '' |
| $MnCO_3$ | 0.033 | '' | 0.808 | '' |

The blended materials are two-step heat treated in the same manner as described in Example 1. The resulting phosphor is a finely divided powder exhibiting an emission peak at about 510nm, a one-half peak height band width of 33.3nm and a relative emitted radiant energy evaluation of 112% when compared to the product of Example 1.

EXAMPLE 3

An intimate blend is prepared as in Example 1:

| | | | | |
|---|---|---|---|---|
| MgO | 0.427 | mol (rel.) | 3.442 | grams/0.2 mol |
| $MgF_2$ | 0.500 | '' | 6.231 | '' |
| $\beta$-$Ga_2O_3$ | 0.550 | '' | 20.618 | '' |
| $Al(OH)_3$ | 0.900 | '' | 14.346 | '' |
| $MnCO_3$ | 0.033 | '' | 0.808 | '' |

The blended materials are two-step heat treated in the same manner as that described in Example 1. The resulting phosphor is a finely divided powder exhibiting an emission peak at about 512nm, a one-half peak height band width of 35.0nm, and a relative emitted radiant energy evaluation of 101% when compared with the product of Example 1.

It will be seen from the above that there is herein provided a new and novel process for manufacturing improved gallate phosphors incorporating aluminum to shift the emission peak. Not only is the prior art problem of decreased luminescence intensity eliminated, but in many instances the aluminum substituted material is brighter than the pure gallate. In addition, the processing time is drastically reduced because of the fluorine addition to the raw materials.

While there have been shown and described what are at present considered to be the preferred embodiments of the invention, it will be apparent to those skilled in the art that various changes and modifications can be made therein without departing from the scope of the invention as defined by the appended claims.

What is claimed is:

1. A method of manufacturing luminescent materials selected from the group consisting essentially of magnesium gallate and magnesium aluminum gallate activated by manganese which comprises the steps of: forming a mixture of raw materials which will yield said luminescent materials; including in said raw materials a source of fluorine; thoroughly mixing said raw materials and said source of fluorine; heat treating said raw materials in aluminum crucibles in a humidified, oxidizing atmosphere for about 2 hours at a temperature of about 1200°C–1300°C; cooling and comminuting said material; reheating said material in silica crucibles in a reducing atmosphere for less than 40 minutes at a temperature of about 1200°C–1300°C; and cooling, comminuting and sieving said material.

2. The method of claim 1 wherein said raw materials include a magnesium source selected from the group consisting essentially of MgO and $MgCO_3$ and said fluorine source includes $MgF_2$ wholly or partially substituted for said MgO or $MgCO_3$.

3. The method of claim 2 wherein said luminescent material produced has the general formula

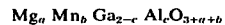

$Mg_a Mn_b Ga_{2-c} Al_c O_{3+a+b}$ wherein
0.85 ≤ $a+b$ ≤ 1.05
0 ≤ $c$ ≤ 1.2
0.001 ≤ $b$ ≤ 0.06.

4. The method of claim 1 wherein said reducing atmosphere comprises a mixture of $H_2$ and $N_2$ with said $H_2$ being present in an amount of about 0.25 to 1.00% by volume.

* * * * *